(12) United States Patent
Seppi

(10) Patent No.: US 7,244,943 B2
(45) Date of Patent: Jul. 17, 2007

(54) X-RAY IMAGE ACQUISITION APPARATUS

(75) Inventor: Edward J. Seppi, Portola Valley, CA (US)

(73) Assignee: Varian Medical Systems Technologies, Inc., Palo Alto, CA (US)

(*) Notice: Subject to any disclaimer, the term of this patent is extended or adjusted under 35 U.S.C. 154(b) by 0 days.

(21) Appl. No.: 10/959,034

(22) Filed: Oct. 4, 2004

(65) Prior Publication Data

US 2005/0045828 A1 Mar. 3, 2005

Related U.S. Application Data

(63) Continuation of application No. 10/013,199, filed on Nov. 2, 2001, now Pat. No. 6,800,858.

(51) Int. Cl.
*G01T 1/20* (2006.01)

(52) U.S. Cl. .................................... 250/367
(58) Field of Classification Search ............... 250/367; 378/16, 65
See application file for complete search history.

(56) References Cited

U.S. PATENT DOCUMENTS

| | | | |
|---|---|---|---|
| 4,262,202 A | 4/1981 | Cusano et al. | |
| 4,362,946 A | 12/1982 | Cusano et al. | |
| 4,734,588 A | 3/1988 | Akai | |
| 4,870,667 A * | 9/1989 | Brunnett et al. | 378/19 |
| 5,144,141 A | 9/1992 | Rougeot et al. | |
| 5,150,394 A | 9/1992 | Karellas | |
| 5,187,369 A | 2/1993 | Kingsley et al. | |
| 5,233,990 A * | 8/1993 | Barnea | 600/427 |
| 5,524,133 A | 6/1996 | Neale et al. | |
| 5,636,299 A | 6/1997 | Bueno et al. | |
| 5,831,269 A * | 11/1998 | Nakamura et al. | 250/367 |
| 5,854,684 A | 12/1998 | Stabile et al. | |
| 5,956,382 A * | 9/1999 | Wiener-Avnear et al. | 378/98.8 |
| 6,236,051 B1 | 5/2001 | Yamakawa et al. | |
| 6,429,578 B1 * | 8/2002 | Danielsson et al. | 313/105 CM |
| 6,487,274 B2 * | 11/2002 | Bertsche | 378/143 |
| 6,553,092 B1 | 4/2003 | Mattson et al. | |
| 6,630,675 B2 * | 10/2003 | Ghelmansarai | 250/366 |
| 6,800,858 B1 * | 10/2004 | Seppi | 250/370.11 |

* cited by examiner

*Primary Examiner*—Constantine Hannaher
(74) *Attorney, Agent, or Firm*—Bingham McCutchen LLP

(57) ABSTRACT

An X-ray image acquisition apparatus (15) includes a conversion panel (20) aligned with a photo detector array (40). The conversion panel (20) includes a plurality of conversion cells (22), each including a conversion body (31), an X-ray transparent and light reflective file over the top (32) of the body (31), and a light reflective film (36) surrounding the body (31). The body (31) is made of a scintillating material that efficiently generates optical light photons in response to X-ray radiation illuminating thereon and is substantially transparent to the optical light photons. The body (31) is also sufficiently long to absorb the X-ray radiation over a wide range of energy levels. The light reflective films (36, 38) collimate the optical light photons generated in the body (31) toward the photo detector array (40) to form X-ray images.

20 Claims, 4 Drawing Sheets

X-RAY IMAGE ACQUISITION APPARATUS

RELATED APPLICATION DATA

This application is a continuation of U.S. patent application Ser. No. 10/013,199, filed Nov. 2, 2001, now U.S. Pat. No. 6,800,858, the entire disclosure of which is expressly incorporated by reference herein.

FIELD OF THE INVENTION

The present invention relates, in general, to image acquisition and specifically to X-ray image acquisition.

BACKGROUND OF THE INVENTION

X-ray imaging is widely used in various fields of life. For example, X-ray imaging has been a standard medical diagnostic tool for decades. A typical X-ray image acquisition apparatus suitable for low energy X-rays includes a phosphor X-ray conversion screen and a photo detector array aligned with each other. The phosphor conversion screen generates optical light photons in response to the X-ray radiation. The optical light photons are transmitted to the photo detector array under the conversion screen. The photo detector array generates electric signals in response to the optical light photons. Electronics circuitry coupled to the photo detector array processes the electric signals and generate images. A typical high energy X-ray image acquisition apparatus includes a copper screen and a Gadolinium Oxysulfide panel over a photo detector array. The high energy X-ray radiation passes through the copper screen, which absorbs a portion of the X-ray radiation and generates energetic electrons. The electrons pass into the Gadolinium Oxysulfide panel and generate optical light photons. Another portion of the X-ray radiation passes through the copper screen and interacts with Gadolinium oxysulfide to produce optical light photons. The photo detector array senses the optical light photons and generates electric signals in response thereto.

Different applications require images acquired using X-ray radiation at different energy levels. For example in the field of medical diagnostic procedures, low energy "diagnostic" X-ray images are generally used in soft tissue diagnostics, and high energy X-rays are used for treatment in radiation oncology and imaging are produced with imaging systems in conjunction with the treatment. The quality of the acquired image depends on the image acquisition procedures and the equipment used.

X-ray images at different energy levels are presently created using different image acquisition apparatuses as described above. Maintaining multiple sets of X-ray image apparatuses will increase the operating and overhead costs for a medical diagnostic facility. It will also affect the efficiency of the facility by increasing the idle time of the apparatuses, These effects are exasperated further for those facilities with relatively small patient bases.

Accordingly, it would be advantageous to have an apparatus that is capable of forming X-ray images with X-rays at different energy levels. It is desirable for the apparatus to be simple and reliable. It is also desirable if the apparatus can be used on an existing X-ray imaging system. It would be of further advantage to be able to optimize the image quality for its intended use.

SUMMARY OF THE INVENTION

A primary benefit of the present invention is providing an apparatus capable of forming X-ray images with X-rays at different energy levels. A particular benefit of some embodiments of the present invention is providing the apparatus that is simple and reliable. A specific benefit of some embodiments of the present invention is providing the apparatus that can be used on existing X-ray imaging systems. An additional benefit in accordance with some embodiments of the present invention is providing the apparatus that is capable of optimizing the image quality for its intended use.

In order to achieve these and other objectives of the present invention, an X-ray image acquisition apparatus includes an X-ray conversion panel aligned with a photo detector array. The X-ray conversion panel generates optical light photons in response to the X-ray radiation of different energy levels. The photo detector array generates electric signals in response to the optical light photon received from the X-ray conversion panel.

In accordance with an embodiment of the present invention, the conversion panel is made up of a plurality of X-ray conversion cells arranged in a two-dimensional array. Each conversion cell has a conversion body in its core. The conversion body is made of a scintillating material, e.g., Cesium Iodine, Bismuth Germanate, Cadmium Tungstate, etc., that generates optical light photons in response to X-ray radiation illuminating thereon and is substantially transparent to the generated optical light photons. The conversion bodies are preferably sufficiently long to absorb the X-ray radiation over a wide range of energy levels. Light reflective films are attached to the sidewalls of the conversion bodies to collimate the optical light photons generated in the conversion bodies. The cross section areas of the conversion bodies are preferably sufficiently small to provide a satisfactory spatial resolution of the X-ray image generated using the conversion panel. In a preferred embodiment, the top of each conversion body is covered with an X-ray transparent and light reflective film. This film reflects those optical light photons generated in the conversion bodies and propagating away from the photo detector array, thereby increasing the efficiency of the conversion panel.

In accordance with an embodiment, the photo detector array includes an array of photo detectors aligned with the conversion cells in the conversion panel and generating electric signals in response to the optical light photons received from the corresponding conversion cells in the conversion panel. Electronics circuits coupled to the photo detector array process the electric signals and generate the images.

DETAILED DESCRIPTION OF THE PREFERRED EMBODIMENTS

Figure 1:
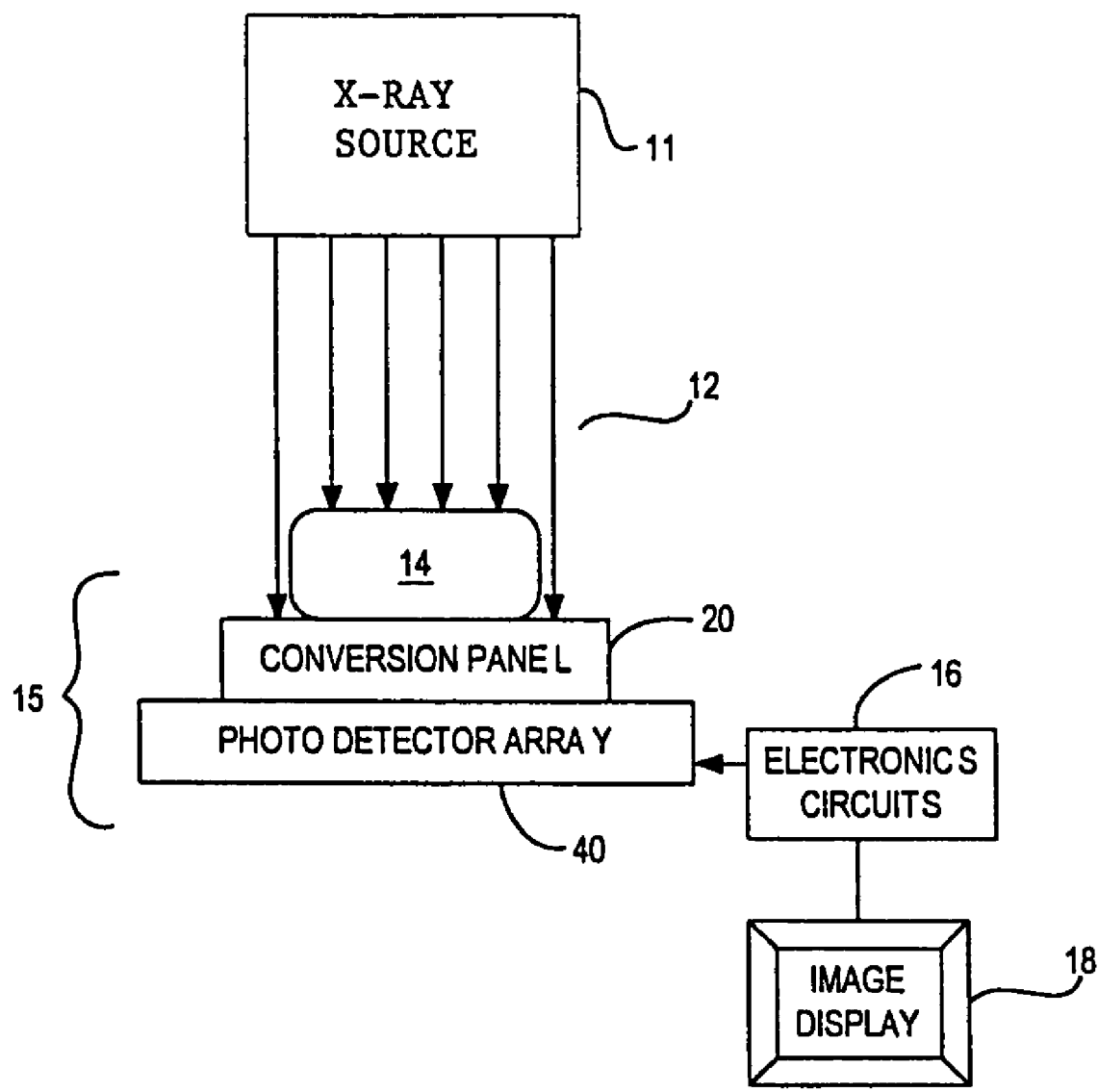
FIG. 1 illustrates an X-ray imaging system that includes an X-ray image acquisition apparatus.

Preferred embodiments of the present invention are described herein below with reference to the drawings. It should be noted that the drawings are not to scales and elements of similar structures or similar functions are label with like reference numerals in the drawings.

FIG. 1 is a block diagram schematically illustrating an X-ray imaging system 10 in accordance with an embodiment of the present invention. X-ray imaging system 10 includes an X-ray radiation source 11 generating X-ray radiation 12 and an X-ray image acquisition apparatus 15. In accordance with a preferred embodiment of the present invention, radiation source 11 is capable of generating X-ray radiation 12 at various energy levels. By way of example, radiation source 11 is able to generate X-ray radiation 12 at a plurality of photon energy level raging between approximately 40 kilo-electron-volts (keV) to approximately 20 mega-electron-volts (MeV). Radiation sources capable of generating X-ray radiation at different energy levels are described in U.S. patent application Ser. No. 10/033,327 entitled "RADIOTHERAPY APPARATUS EQUIPPED WITH AN ARTICULABLE GANTRY FOR POSITIONING AN IMAGING UNIT" and filed on Nov. 2, 2001, which is incorporated herein by reference in its entirety.

X-ray radiation 12 is used to form images an object 14 placed between radiation source 11 and X-ray image acquisition apparatus 15. The nature of object 14 depends on the application of X-ray imaging system 10. For example, in one application in accordance with the present invention, X-ray imaging system 10 is a piece of medical diagnostic equipment and object 14 is a patient. In another application, X-ray imaging system 10 is a structure inspection equipment and object 14 is a machine part to be inspected. In yet another application in accordance with the present invention, X-ray imaging system 10 is a security or custom inspection equipment and object 14 is a piece of luggage or cargo to be inspected. It should be understood that these examples are not meant to be exhaustive regarding the applications of X-ray imaging system 10.

X-ray image acquisition apparatus 15 includes an X-ray conversion panel 20 and a photo detector array 40 suitably aligned with each other. During an imaging process, X-ray radiation 12 illuminates X-ray image acquisition apparatus 15. As shown in FIG. 1, portions of X-ray radiation 12 reaches X-ray image acquisition apparatus 15 after passing through object 14. Because of their compositions and densities, different parts of object 14, e.g., different tissues in the body of a patient, may attenuate X-ray radiation 12 differently. For example, the bones in a patient generally attenuate X-ray radiation 12 more significantly than the soft tissues. In response to X-ray radiation 12 illuminating thereon, X-ray image acquisition apparatus 15 generates electric signals. Electronics circuits 16 coupled to x-ray image acquisition apparatus 15 processes the electric signals and generates the X-ray images of object 14 at a display device 18.

Figure 2:
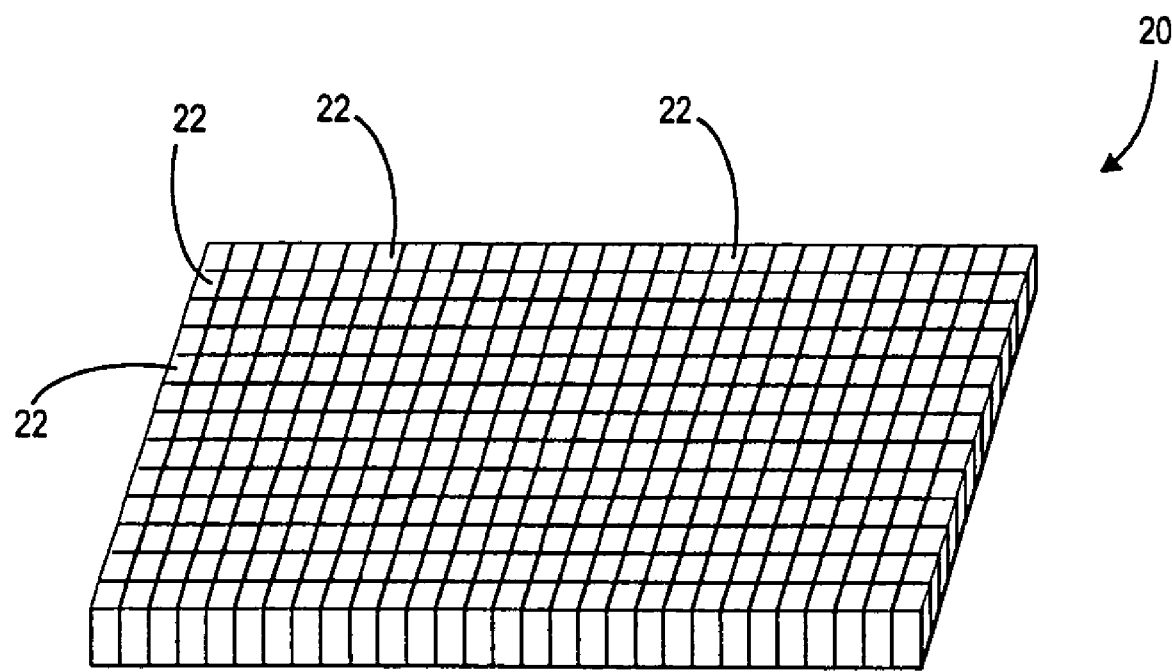
FIG. 2 illustrates a panel in the X-ray image acquisition apparatus of FIG. 1.

FIG. 2 schematically shows X-ray conversion panel 20 in X-ray image acquisition apparatus 15 in accordance with an embodiment of the present invention. Panel 20 includes a plurality of cells 22. In one embodiment, cells 22 are arranged in a two-dimensional array a plurality of rows and a plurality of columns. Cells 22, which are also referred to as X-ray conversion cells or conversion cells, are configured to generate optical light photons in response to X-ray radiation 12 shown in FIG. 1. In accordance with one embodiment, adhesive is used to form conversion panel 20 from X-ray conversion cells 22. In accordance with another embodiment, a grid (not shown) is used to arrange conversion cells 22 into the two-dimensional array of X-ray conversion panel 20. Other means can also be used to form the array of X-ray conversion panel 20 using conversion cells 22.

Figure 3:
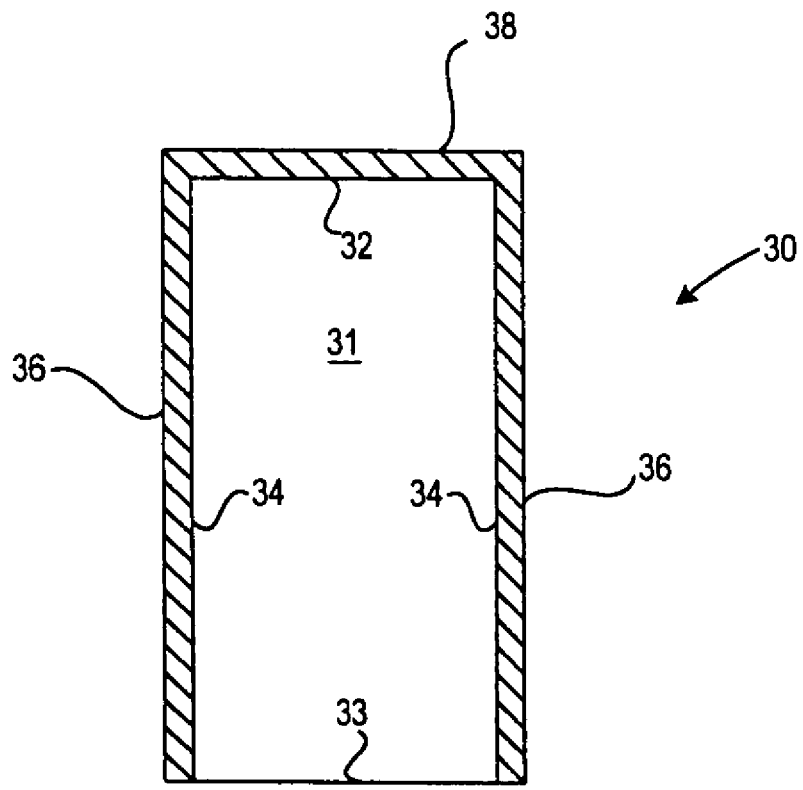
FIG. 3 shows a cell in the panel of FIG. 2.

FIG. 3 is a schematic cross sectional view of an X-ray conversion cell 30 in accordance with an embodiment of the present invention. Cell 30 can be any of conversion cells 22 that form X-ray conversion panel 20 shown in FIG. 2.

Conversion cell 30 includes an X-ray conversion body 31 having first end 32, a second end 33, and a sidewall 34 extending at least partially between first end 32 and second end 33. In accordance with one embodiment, conversion body 31 a rod, in which first end 32 and second end 33 are a top and a bottom, respectively, of rod 31. Conversion body 31 also has a sidewall 34 between first end 32 and second end 33. In accordance with the present invention, conversion body 31 is made of a material that generates optical light photons in response to X-ray radiation.

Preferably, conversion body 31 is capable of absorbing the X-ray radiation at various energy levels. In accordance with an embodiment of the present invention, conversion cell 31 is able to generate the optical light photons have a spectrum ranging between infrared and ultraviolet in response to the X-ray radiation having photon energy levels ranging between approximately 40 kilo-electron-volts (keV) and 20 mega-electron-volts (MeV). These characteristics are achieved by selecting a suitable material and an appropriate length or height for conversion body 31. In accordance with an embodiment of the present invention, the material has a high X-ray radiation absorption efficiency and is substantially transparent to the optical light photons. Preferred materials for conversion body 31 include Cesium Iodine, Bismuth Germanate, Cadmium Tungstate, etc. Generally, the longer conversion cell 31, the more X-ray radiation it can absorb. Preferably, conversion cell 31 has an optimum length or height depending on X-ray absorption efficiency, image resolution, light collection efficiency, and other parameters of the X-ray imaging system design. By way of example, conversion cell 31 has a length or height of at least 0.5 centimeter. In one embodiment, conversion cell 31 has a length or height of approximately one centimeter. Conversion cell 31 can also have a length greater than one centimeter. As shown in FIGS. 2 and 3, the length or height of conversion cell 31 substantially determines the thickness of conversion panel 20.

In one embodiment, first end 32 and second end 33 of conversion body 31 have substantially the same geometric shape and size, and are substantially parallel to each other. In addition in the embodiment, sidewall 34 of conversion body 31 is substantially perpendicular to first end 31 and second end 33. In an embodiment optimized for spatial resolution, conversion bodies 31 in conversion panel 20 are configured to point to a spot, from which X-ray radiation source 11 emits X-ray radiation 12. Preferred geometric shapes for first end 32 include square, rectangle, hexagon, etc. The size of first end 32 determines the spatial resolution of the images formed using conversion panel 20. In accordance with a an embodiment, first end 32 of conversion body 31 is a square having a side raging between approximately 0.1 millimeter and approximately 0.5 millimeter. In accordance with a specific embodiment, the side of square shaped first end 32 of conversion body 31 is 0.388 millimeter, which matches the photo diode pitch in photo detector array 40.

Conversion cell 30 further includes a light reflective film 36 attached to sidewall 34 of conversion body 31. Film 36 surrounds conversion body 31 and reflects those optical light photons propagating toward sidewall 34 back to the interior of conversion body 31. Therefore, film 36 serves to collimate and reflect the optical light photons generated in conversion body 31. In a specific embodiment, conversion cell 30 also includes an X-ray transparent and light reflective film 38 attached to first end 32 of conversion body 31. Film 38 reflects those optical light photons propagating toward first end 32 back toward second end 33 of conversion body 31, thereby increasing the intensity of the light reaching photo detector array 40 under conversion panel 20 in X-ray image acquisition apparatus 15 as shown in FIG. 1. In one embodiment, film 38 on first end 32 of conversion body 31 is a portion of an X-ray transparent and light reflective film covering the entire first end of conversion panel 20 shown in FIG. 2. The film covers the first ends of all conversion cells 22 in X-ray conversion panel 20. In another embodiment, film 38 is integrally formed with film 36 attached to sidewall 34 of conversion body 31. In this embodiment, film 36 and film 38 form a light reflective pocket, in which conversion body 31 is positioned. In yet another embodiment, film 36 for different conversion cells 22 in conversion panel 20 form a grid and conversion cells 22 are positioned in the grid, thereby forming the two-dimensional array of conversion cells in conversion panel 20. Film 36 and film 38 can be made of light reflective materials commercially available. For example, a powder of small grain Magnesium Oxide supported by an appropriate adhesive is a suitable material for light reflective film 36 and film 38. It should be understood that the proper operation of X-ray image acquisition apparatus 15 requires film 38 attached to first end 32 of conversion body 31 to be transparent to the X-ray radiation. On the other hand, whether film 36 attached to sidewall 34 of conversion body 31 is transparent to the X-ray radiation does not significantly affect the operation of X-ray image acquisition apparatus 15.

Figure 4:
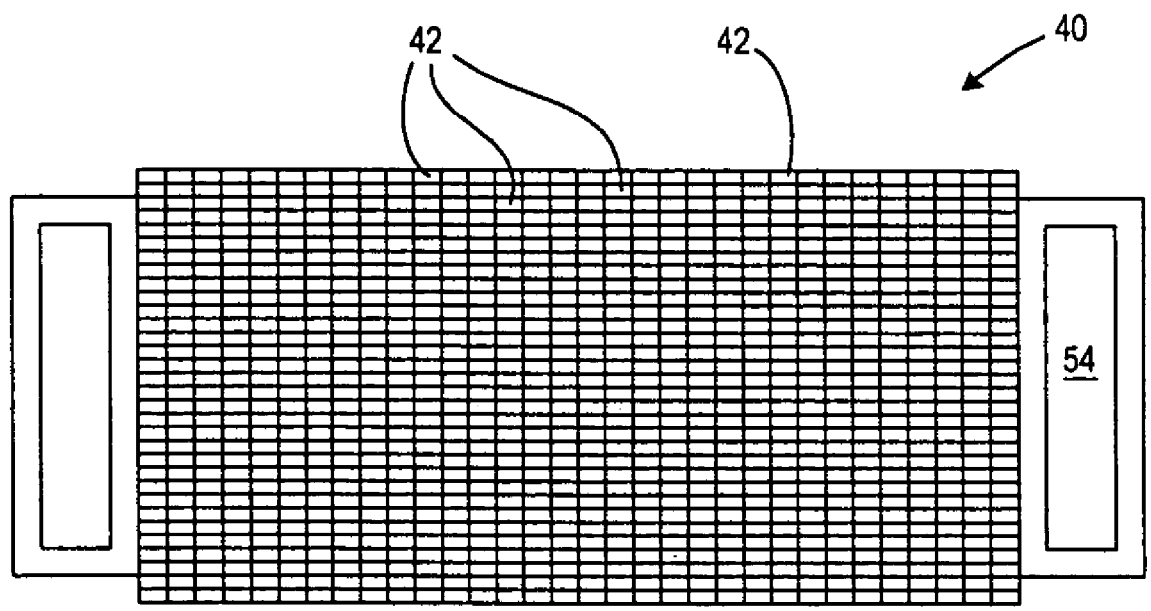
FIG. 4 illustrate a photo detector array in the X-ray image acquisition apparatus of FIG. 1.

FIG. 4 is a top view of photo detector array 40 in X-ray image acquisition apparatus 15 in accordance with an embodiment of the present invention. Photo detector array 40 includes a plurality of photo detectors 42 arranged in a two-dimensional array. Photo detectors 42 are configured to generate electric signals in response to the optical light photons illuminating thereon. In a specific embodiment, photo detectors 42 are amorphous silicon photo detectors. Each of photo detectors 42 forms a pixel of the X-ray image generated using photo detector array 40. Photo detector array 40 also includes a pixel access circuit 44 coupled to photo detectors 42. Pixel access circuit 44 accesses photo detectors 42 and reads the electric signals from photo detectors 42. The process of accessing photo detectors 42 and reading electric signals therefrom is known to those skilled in the art. In accordance with a specific embodiment, pixel access circuit 44 generates row access signals to sequentially access photo detectors 42 by rows and reads electric signals out of photo detectors 42 by columns. Each row access signal can access either a single row or a plurality rows of photo detectors 42. Likewise, each read action can read electric signals from either a single column or a plurality of columns of photo detectors 42.

The size of each photo detector 42, which is also referred to as a pixel size, determines the spatial resolution of the X-ray images generated using photo detector array 40. Smaller the pixel size results in better spatial resolution. Accessing more than one rows and reading electric signals from more than one columns during each read action increase the reading speed, but it will result in lower spatial resolution.

Preferably, photo detectors 42 in photo detector array 40 are aligned with X-ray conversion cells 22 in X-ray conversion panel 20. In one embodiment, each conversion cell 22 in conversion panel 20 is aligned with one photo detector 42 in photo detector array 40. In this embodiment, the size of conversion cells 22 is about the same as that of photo detectors 42. The maximum spatial resolution of the X-ray images generated using X-ray image acquisition apparatus 15 is equal to the pixel size of photo detectors 42 in photo detector array 40. In an alternative embodiment, conversion cells 22 in X-ray conversion panel 20 are larger than photo detectors 42 in photo detector array 40 and each conversion cell 22 is aligned with more than one photo detectors 42. In this embodiment, the maximum spatial resolution of the X-ray images is determined by the size of conversion cells 22.

FIG. 4 shows pixel access circuit 44 located on the side of photo detectors 42. This arrangement keeps pixel access circuit 44 out of the propagation paths of X-ray radiation 12 from X-ray source 11 and the optical light photons generated in conversion panel 20, thereby benefiting the lifetime of pixel access circuit 44. However, the present invention is not limited to such an arrangement. In an alternative embodiment, photo detectors 42 are mounted on one side of a substrate and pixel access circuit 44 is located on the other side of the substrate. The substrate protects pixel access circuit 44 from possible damage caused by the X-ray radiation and the optical light photon illumination. This arrangement reduces the physical size of photo detector array 40 without reducing the number of pixels therein.

By now it should be appreciated that an X-ray image acquisition apparatus capable of forming images of X-rays at different energy levels has been provided. The X-ray image acquisition apparatus in accordance with the present invention includes an X-ray conversion panel aligned with a photo detector array. The X-ray conversion panel is configured to generate optical light photons in response to the X-ray radiation. The conversion panel includes a plurality of conversion cells, each including a conversion body in its core and a light reflective film surrounding the body. The conversion body is made of a material that efficiently generates optical light photons in response to X-ray radiation illuminating thereon and is substantially transparent to the optical light photons. The conversion bodies are preferably sufficiently long to absorb the X-ray radiation over a wide range of energy levels. The light reflective films collimate the optical light photons generated in the conversion bodies. In a preferred embodiment, the first ends of conversion bodies are covered with an X-ray transparent and light reflective film to increase the efficiency of the conversion panel. The photo detector array aligned with the conversion panel is configured to generate electric signals in response to the optical light photons received from the conversion panel. Electronics circuits coupled to the photo detector array process the electric signals and generate the images.

While preferred embodiments of the present invention have been described with reference to the drawings, these are not intended to limit the scope of the present invention, which is set forth in the appending claims. Various modifications of the above described embodiments can be made by those skilled in the art after browsing the specification of the subject application. These modifications are within the scope and true spirit of the present invention. For example, the photo detector array in the X-ray image acquisition apparatus can be replaced with a photographic film that is sensitive to the optical light photons generated in the X-ray conversion panel in accordance with the present invention. Further, the X-ray image acquisition apparatus is not limited to being used on an imaging system with an X-ray radiation source capable of generating X-rays at different energy levels. The X-ray image acquisition apparatus of the present invention can be used on different imaging systems, each system including an X-ray radiation source that is capable of generating X-ray radiation either at a single energy level or at multiple energy levels.

The invention claimed is:

1. A method of performing a radiation process, comprising:
   providing a panel having a plurality of cells, each of the plurality of cells including a body made of a scintillating material;
   using the panel to generate optical light photons in response to diagnostic X-ray radiation for generating a first image, wherein the first image comprises a low energy diagnostic X-ray image; and
   using the panel to generate optical light photons in response to treatment X-ray radiation for generating a second image;
   wherein the body in each of the plurality of cells in the panel has a height that is at least 0.5 centimeter.

2. The method of claim 1, wherein the body in each of the plurality of cells has a height of approximately one centimeter.

3. The method of claim 1, wherein each of the plurality of cells is configured for generating optical light photons in response to diagnostic X-ray radiation, and for generating optical light photons in response to treatment X-ray radiation.

4. The method of claim 1, wherein each of the plurality of cells in the panel further includes a light reflective film attached to a side wall of the body and an X-ray transparent and light reflective film attached to an end of the body.

5. The method of claim 1, wherein an end of the body in each of the plurality of cells in the panel is substantially a square having a side that is between approximately 0.05 millimeter and approximately 0.5 millimeter.

6. The method of claim 1, wherein a photon energy level of the diagnostic X-ray radiation is in a kilo-electronvolt range.

7. The method of claim 1, wherein a photon energy level of the treatment X-ray radiation is in a mega-electronvolt range.

8. The method of claim 1, wherein at least a portion of the panel is made of Cesium Iodine.

9. The method of claim 1, wherein at least a portion of the panel is made of Bismuth Germanate.

10. The method of claim 1, wherein at least a portion of the panel is made of Cadmium Tungstate.

11. The method of claim 1, further comprising using a photo detector array that is aligned with the panel.

12. A method of performing a radiation process, comprising:
    providing a conversion panel configured to absorb diagnostic X-ray radiation and treatment X-ray radiation;
    using the panel to generate optical light photons in response to diagnostic X-ray radiation exited from an object for generating a first image of the object, wherein the first image composes a low energy diagnostic X-ray image; and
    using the panel to generate optical light photons in response to treatment X-ray radiation exited from the object for generating a second image of the object;
    wherein the conversion panel has a height that is at least 0.5 centimeter.

13. The method of claim 12, wherein the conversion panel has a plurality of conversion bodies made of a scintillating material, and a light reflective film is attached to a side wall of one of the plurality of conversion bodies.

14. The method of claim 13, wherein the conversion panel further includes a X-ray transparent and light reflective film covering an end of one of the plurality of conversion bodies.

15. The method of claim 13, wherein each of the plurality of conversion bodies has a height sufficient to absorb the diagnostic X-ray radiation and the treatment X-ray radiation.

16. The method of claim 12, wherein at least a portion of the panel is made from a material selected from the group consisting of Cesium Iodine, Bismuth Germanate, and Cadmium Tungstate.

17. The method of claim 12, wherein the diagnostic X-ray radiation has a photon energy level in a kilo-electronvolt range, and the panel is used to generate optical light photons in response to the diagnostic X-ray radiation.

18. The method of claim 12, wherein the treatment X-ray radiation has a photon energy level in a mega-electronvolt range, and the panel is used to generate optical light photons in response to the treatment X-ray radiation.

19. The method of claim 12, further comprising using a photo detector array that is aligned with the conversion panel to generate electric signals.

20. The method of claim 19, wherein the photo detector array includes a plurality of amorphous silicon detectors.

* * * * *